United States Patent [19]

Smith, Jr. et al.

[11] Patent Number: 4,939,361
[45] Date of Patent: Jul. 3, 1990

[54] METHOD FOR CORRECTING GAMMA RAY SPECTRA FOR BOREHOLE TRACER INTERFERENCE

[75] Inventors: Harry D. Smith, Jr.; Larry L. Gadeken, both of Houston, Tex.

[73] Assignee: Halliburton Logging Services, Inc., Houston, Tex.

[21] Appl. No.: 211,521

[22] Filed: Jun. 24, 1988

[51] Int. Cl.$^5$ .............................................. G01V 5/00
[52] U.S. Cl. .................................... 250/260; 250/269
[58] Field of Search .............. 250/260, 261, 262, 269, 250/253

[56] References Cited

U.S. PATENT DOCUMENTS 4,717,825  1/1988  Smith et al. ........................ 250/262
4,825,071  4/1989  Gadeken et al. .................... 250/256

FOREIGN PATENT DOCUMENTS 50-434837  3/1972  U.S.S.R. .............................. 250/269

Primary Examiner—Janice A. Howell
Assistant Examiner—Richard Hanig
Attorney, Agent, or Firm—William J. Beard

[57] ABSTRACT

Techniques are shown for determining the distribution of plural tracer isotopes located inside and outside a cased well borehole. Standard gamma ray spectra of plural tracer isotopes taken inside and outside (and possibly intermediate) a well borehole are fitted to an unknown gamma ray spectrum of a well having plural tracer isotopes used therein. Techniques using a priori knowledge of well geometry and not using such knowledge are disclosed for performing the analysis of the unknown well spectrum.

6 Claims, 3 Drawing Sheets

METHOD FOR CORRECTING GAMMA RAY SPECTRA FOR BOREHOLE TRACER INTERFERENCE

BACKGROUND OF THE INVENTION

Gamma ray spectroscopy well logging tools are significantly expanding the use of multiple radioactive isotope tracers in monitoring down hole operations. These well logging tools can measure the energy of gamma rays which are emitted by radioactive tracers placed in the well being logged Multiple tracer surveys may be obtained by deconvolving the gamma ray spectral data into contributions from each individual isotope as a function of depth. Multiple tracer logs can give such useful information as fluid fracture height versus propant height as well as the effectiveness of multi-stage treatments and hydraulic fracturing operations. Well cementing applications can include the locations of different types of cements and measurement of average radial cement thickness.

A potential problem which can occur in the use of multiple tracers in a gamma ray spectroscopy tracer logging system is that, due to variations in the Compton scattering and photoelectric absorption of gamma rays between the tracer source and the detector, the shape of the gamma ray spectrum can change with changes in tracer location. The change of shape of such gamma ray energy spectra due to Compton scattering and photoelectric absorption can impair a weighted least-square fitting technique which assumes as the standard spectra those taken but with the tracer in a particular geometrical region (i.e., the formation), if this region is different from the actual tracer location in the well of interest For example, if some of the tracers in a well borehole are actually located inside the casing, but the standard spectra were derived for tracers located only in the formation, the computed tracer concentration will be in error.

Studies conducted by the inventors have indicated that more accurate results in the use of multi-isotopes can be achieved wherein compensation techniques are used to correct the formation tracer concentrations computed from the observed gamma ray spectra for the occurrence of isotope contamination in the well borehole. Since the spectral shape from each tracer element is a function of both the energies of the gamma rays emitted and the location of the tracer in the downhole geometry, it is possible to develop standard tracer spectral shapes for each tracer in both the borehole and in the formation. The least squares fitting therefore can incorporate spectral components for each tracer in both the borehole and formation. The least-square solution will therefore not only determine the total tracer concentration for each isotope, but also the relative distribution of each tracer between the borehole and the formation.

BRIEF DESCRIPTION OF THE INVENTION

Techniques are disclosed in the present application in which compensation of the measured or observed gamma ray spectra in a tracer logging system using a gamma ray spectral logging tool are compensated for the occurrence within and without the well borehole of the gamma ray spectra attributable to the tracer elements. Tracers having half lives ranging from 2.7 to 250 days and comprising gold-198 ($^{198}$Au), iodine-131 ($^{131}$I), antimony-124 ($^{124}$Sb) iridium-192 ($^{192}$Ir) scandium-46 ($^{46}$Sc), and silver-110M ($^{110m}$Ag) can be used for this purpose. Techniques for performing compensation utilizing weighted-least squares fitting for both large diameter (3⅝") and small diameter (1 11/16") gamma ray spectral well logging tools which can be calibrated both in casing and through tubing to perform borehole compensation techniques according to the invention.

Sample or standard gamma ray spectra using the above referenced tracers or others as may be desired, singularly and in combination and disposed both inside the borehole and exterior to the well casing in a cased well are fitted using a weighted-least squares technique. This technique can be performed in real-time at the well site at logging speeds varying from 10-30 ft. per minute.

The direct deconvolution of the borehole and formation components of each of the tracers used in the measured spectra can be applied to situations where up to three tracers are utilized and have components both in the well borehole and in the formation. This can result in the fitting of up to six standard spectral curves to the measured spectra in the unknown borehole. Of course if the geometrical location of one or more tracers are known prior to the execution of the deconvolution program, then it may be possible to simplify the problem by eliminating one or more unnecessary spectral standards from the fitting process. For example, if it is known that tracer A in a two tracer job is located only in the formation, then the borehole standard spectral component for tracer A can be left out of the deconvolution process.

In an alternative technique according to the concepts of the present invention, two data analysis runs are made. In the first run the tracers which are utilized are weighted-least squares fitted utilizing only a single standard spectrum (for instance, the formation standard) for each of the tracer isotopes. That is to say, only formation tracer gamma ray spectral shapes are assumed to be present. Estimated elemental concentrations are then computed for each tracer. Then in zones above or below the zone of interest (that is to say, zones where only the borehole count rate of the tracer is present), the spectral deconvolution will result in considerably erroneous elemental concentrations due to the improper spectral shape of the formation standard spectra being fit to measured spectra which comprises mostly borehole component(s). The data is then reprocessed a second time using a new composite standard shape for each tracer. For each tracer the new standard spectra $S(d)$ are assumed to be a function of the vertical depth (d) in the well borehole and is assumed to be a linear combination of the borehole (B) and formation (F) standard spectra as given by equation 1.

$$S(d) = xB + (1-x)F, x \qquad (1)$$

In Equation 1, the parameter x will, in general, be different for each tracer and can be determined from the relative concentration of each tracer which was calculated using the nominally fit log on the first logging run in a zone of the well containing only borehole tracer, compared to the rest of the well. For example if with the originally processed log, Tracer B reads "u" units in the zone containing borehole tracer only, and reads "u+v" units in a zone containing borehole and formation tracers, then one might approximate x for the second pass data processing as x u/(u+v). Using an iterative technique, x could be further refined with each succeeding process step, using the "u" and "u+v" estimates from the preceding run to develop partition functions for the borehole and formation components. This process will be described in more detail subsequently.

It should be noted that in all the above discussions, the two tracer components are assumed to be borehole and formation components. However, if it is known in a particular application that the observed spectra are composites of count rates from tracers distributed in two other geometrical regions, each with distinct spectral shapes, such as cement and formation components, then the same comments apply to solving for these other two component shapes using the appropriate standards together with the unknown spectra.

It will be apparent to those skilled in the art that the foregoing brief description of the invention will be better understood when taken in conjunction with the following detailed description of the preferred embodiments and the accompanying drawings in which:

DESCRIPTION OF THE PREFERRED EMBODIMENTS

Figure 1:
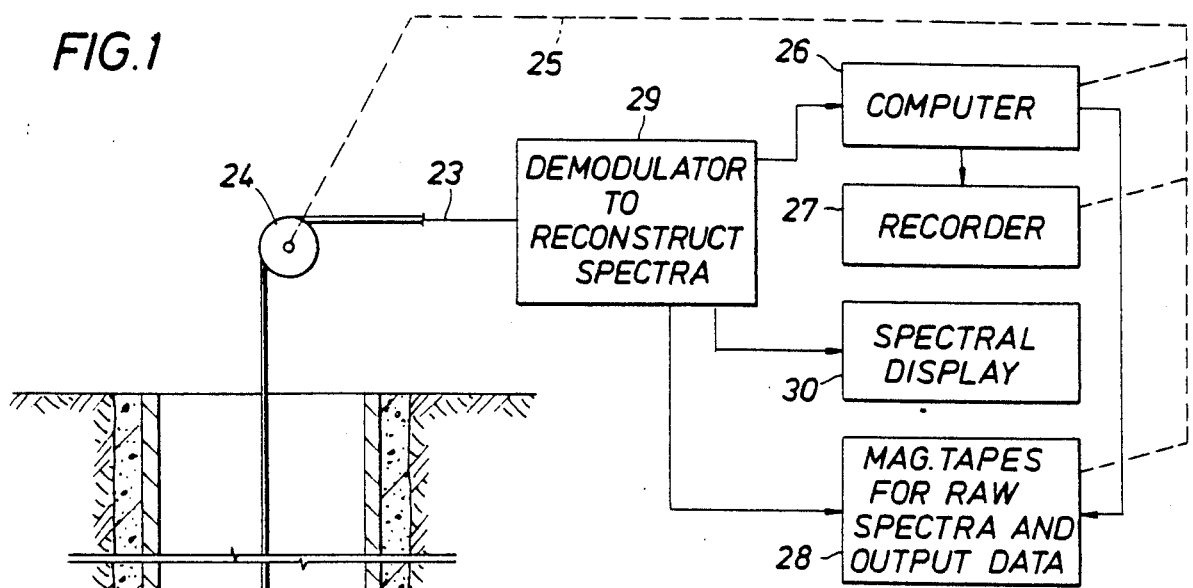
FIG. 1 shows schematically a well logging system utilizing the concepts of the present invention.
Figure 1:
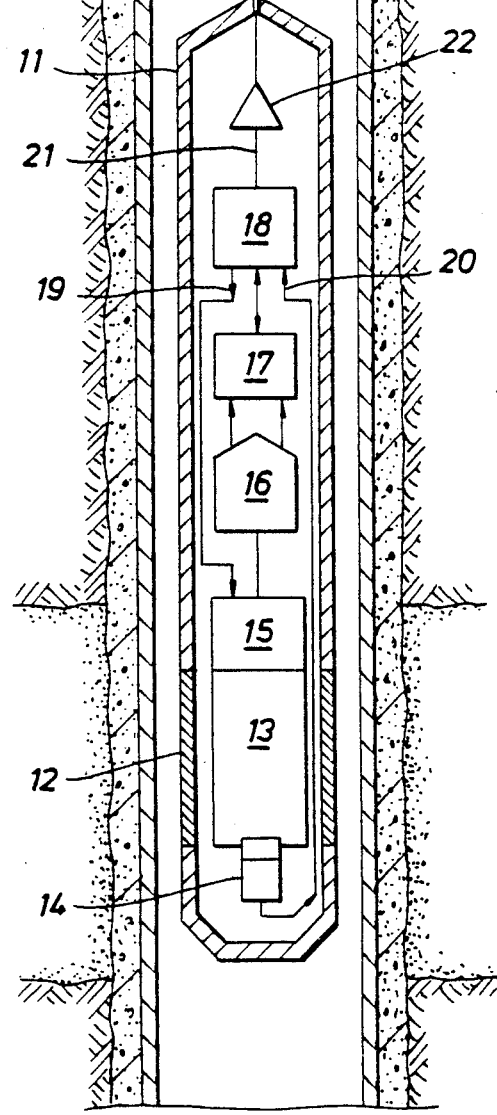

Reference is made initially to a prior U.S. patent application Ser. No. 720,450, filed Apr. 5, 1985 now abandoned in favor of U.S. application 056,033 filed May 27, 1987 now U.S. Pat. No. 4,825,071 which were both assigned to the assignee of the present invention. The applications are entitled "GAMMA RAY BOREHOLE LOGGING METHOD AND APPARATUS HAVING COMPENSATION FOR BOREHOLE ATTENUATION EFFECTS". These prior applications are incorporated herein by reference and disclose techniques of weighted-least squares fitting of standard gamma ray spectra for tracer elements utilized in well bore logging to measured gamma ray spectra taken in cased well boreholes.

Gamma ray energy spectra which are separated into numerous energy channels over the energy range from approximately 0 to approximately 3.5 Mev can be utilized according to the principles of this foregoing applications to fit elemental standard spectra made in laboratory known conditions to the measured spectra taken in unknown well boreholes. Several components of standard spectra of elements dispersed behind the casing in a formation are contemplated for use in this technique.

According to the concepts of the present invention, the weighted-least squares fitting of the standard spectral data taken in boreholes under known conditions are extended to include the shapes of the spectra taken with a known tracer element disposed both inside the well borehole and exterior to the well borehole for one or more of the chosen set of tracer elements which have been described hereinbefore for use in this type of tracer logging.

The use of radioactive isotopes as tracers is widespread throughout the oil industry. Such applications can be particularly important in producing wells and field operations. It is almost always necessary to case and cement a well before it is tested and put on line so that zones of interest can be isolated and so that a seal can be maintained between adjacent geological formations and the surface. In addition, the stimulation of hydrocarbon bearing formations via hydraulic fracturing is a routine operation in many oil wells. In such situations it is possible to add radioactive tracers to one or more of the constituents of the slurry pumped downhole. Subsequently, a gamma ray well logging tool having a gamma ray spectral capability can detect the gamma rays emitted by the tracer elements when the gamma ray spectrum is separated into its energy components at various depth levels of the well. Resulting well logs can show the location of the tracers which are presumably where the accompanying materials were placed in the well.

Many times the desired well completion or stimulation procedures can require that several different materials be placed in a single operation. In the past, it has usually been necessary to limit the complexity of such operations because only one tracer element at a time could be monitored. However, the use of gamma ray spectral tools permits the efficient and accurate monitoring of a set of multiple radioactive tracers. And thus, multiple tracer carrying materials can be used in a single downhole logging operation.

An experimental study utilizing both large ($3\frac{5}{8}''$) and small (1-11/16") diameter well logging tools having a gamma ray spectral capability and utilizing common tracer isotopes such as gold-198, iodine-131, antimony-124, iridium-192, scandium-46 and silver-110m in water soluble form were disposed both interior to a cased well borehole and exterior to the casing in a cased well borehole in test formations. Sufficient concentrations of the tracer to give count rates in the range of 500-1000 American Petroleum Institute gamma ray units were utilized to provide the determination of the gamma ray energy spectra of each of these tracer elements in these configurations. These spectra will be referred to henceforth as the standard gamma ray spectra.

Figure 2:
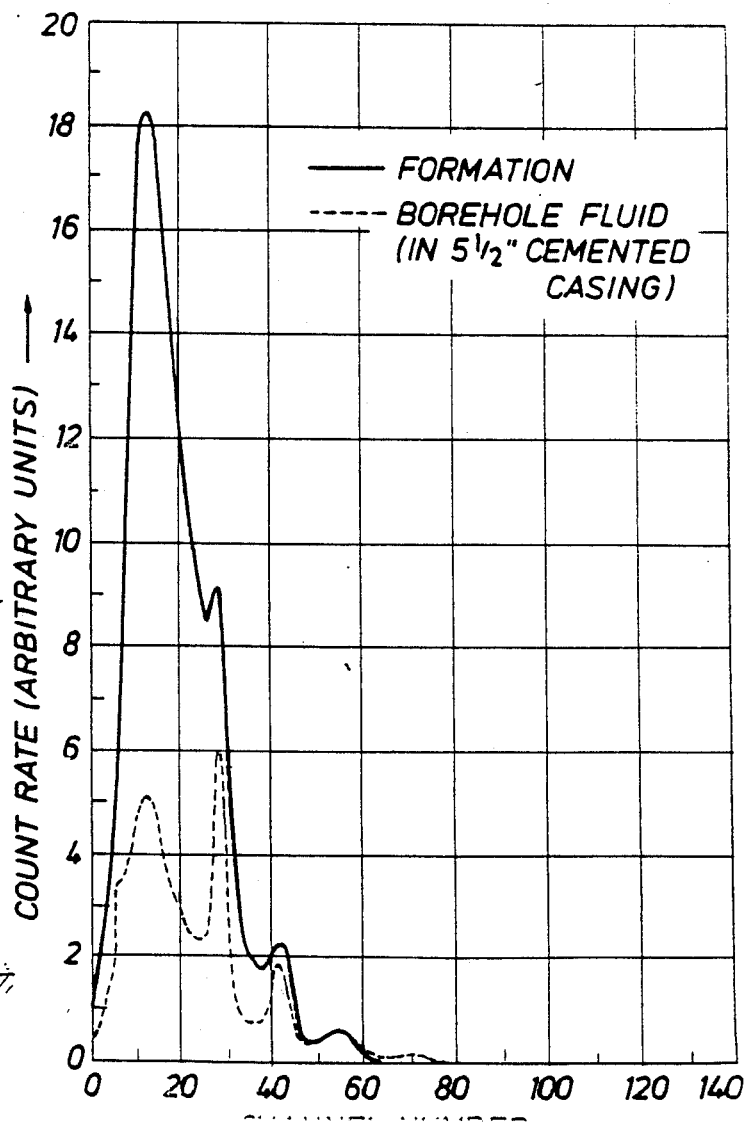
FIG. 2 shows gamma ray spectra for $^{192}$Ir tracer located in the formation and in the borehole using the same logging system in a cased and cemented borehole.

FIG. 2 of the drawings illustrates the dramatic change of shape of the gamma ray spectrum when a radioactive tracer element is placed in the borehole (as indicated by the dotted line drawing of FIG. 2) and in the formation (as indicated by the solid drawing of FIG. 2) for iridium-192. Similarly, FIG. 3 of the drawings illustrates the change of shape effect due to Compton scattering with a scandium-46 tracer located, according to solid curve in the formation, according to the long dashed curve in the cement annulus, and, according to the dotted curve, with the scandium-46 disposed in the borehole fluid in 5½ inch casing.

The spectra of FIG. 2 for iridium-192 were collected using a low atomic number tool case on the logging tool so as to minimize gamma ray absorption in the tool case. Spectral data of FIG. 2 have been normalized so that the amplitude of the 603 kilo electron (keV) volt peaks are the same.

It will be observed that the gamma ray spectrum of iridium-192 from the formation clearly has a different character due to a larger fraction of lower energy scattered gamma rays than the gamma ray spectrum of iridium-192 in the borehole. In fact, the 311 keV peak in the iridium-192 gamma ray formation spectrum is almost totally obscured by the down scattered radiation. This is the peak occurring in approximately channel 28 of the drawing of FIG. 2. It would be apparent to those with skill in the art that if the iridium-192 were located primarily in the borehole, but the proposed weighted-least square deconvolution solution assumed a standard formation spectral shape as illustrated, that significant errors could result for the iridium-192 concentration as determined by the weighted-least square fitting technique. Similarly, such errors could also occur for other tracers actually present in the well either in the borehole or in the formation. Before discussing further the change of shape of the gamma ray spectrum due to the location of the tracer, the nature of the gamma ray spectral measurement system used should be discussed somewhat in more detail.

Referring now to FIG. 1, a gamma ray spectral logging system utilized for making the measurements in accordance with the concepts of the present invention is illustrated schematically. A pressure housing 11 which may comprise a steel housing 11 having a special low atomic number window 12 which may be comprised of a graphite epoxy laminate as disclosed in U.S. Pat. No. 4,504,736 which is assigned to the assignee of this invention can be used in this logging instrument. Alternatively, a titanium pressure housing could be advantageously used.

A two-inch by twelve-inch cylindrically shaped sodium iodide, thallium activated crystal 13 is disposed in the lower end of the pressure housing 11. A coincidence gain stabilizing detector 14 is used to stabilize the gain of the system according to the concepts disclosed in the U.S. Pat. No. 4,300,043 which is assigned to the assignee of the present invention. A photomultiplier amplifier combination 15 is optically coupled to the thalium activated sodium iodide crystal 13 and produces output pulses having a height proportional to the the intensity of the energy lost in the sodium iodide crystal by the gamma rays passing therethrough. A dual range analog to digital converter 16 is connected to the output of the photomultiplier tube and a digitized gamma ray spectrum is supplied therefrom to a data accumulator 17. A microprocessor controller 18 receives output from the data accumulator 17 and also is capable of inputting data to accumulator 17. The microprocessor controller 18 also supplies a stabilizer signal for high voltage control on output line 19 as illustrated. Microprocessor Controller 18 receives coincidence stabilizer pulses on line 20. It will be apparent to those skilled in the art that a non-coincidence type of stabilizer circuit can be implemented when advantageous, e.g., when a steel pressure house is used as in a small diameter (1-11/16") gamma ray spectroscopy tool.

Formatted and encoded gamma ray energy spectra are provided as output from the microprocessor controller 18 on line 21 to a cable driver amplifier 22 from whence they are transmitted via a telemetry system (not illustrated) on the well logging cable 23, for transmission to the surface in a conventional manner. The armored well logging cable 23 passes over a sheave wheel 24 at the surface which (as indicated by the dotted line 25), provides depth information to the computer 26, a recorder 27, and a magnetic tape 28 drive. Signals from the armored well logging cable 23 are supplied to a demodulator 29 for input to the surface computer 26. The recorder 27 displays outputs from the computer 26 which may comprise elemental abundances and gamma ray energy spectra, etc. The direct display of the gamma ray spectra may also be supplied on a Cathode Ray Tube type device 30, if desired. The computer 26 also supplies outputs to the magnetic tape units 28 which may be driven as a function of borehole depth along with the recorder 27.

Figure 3:
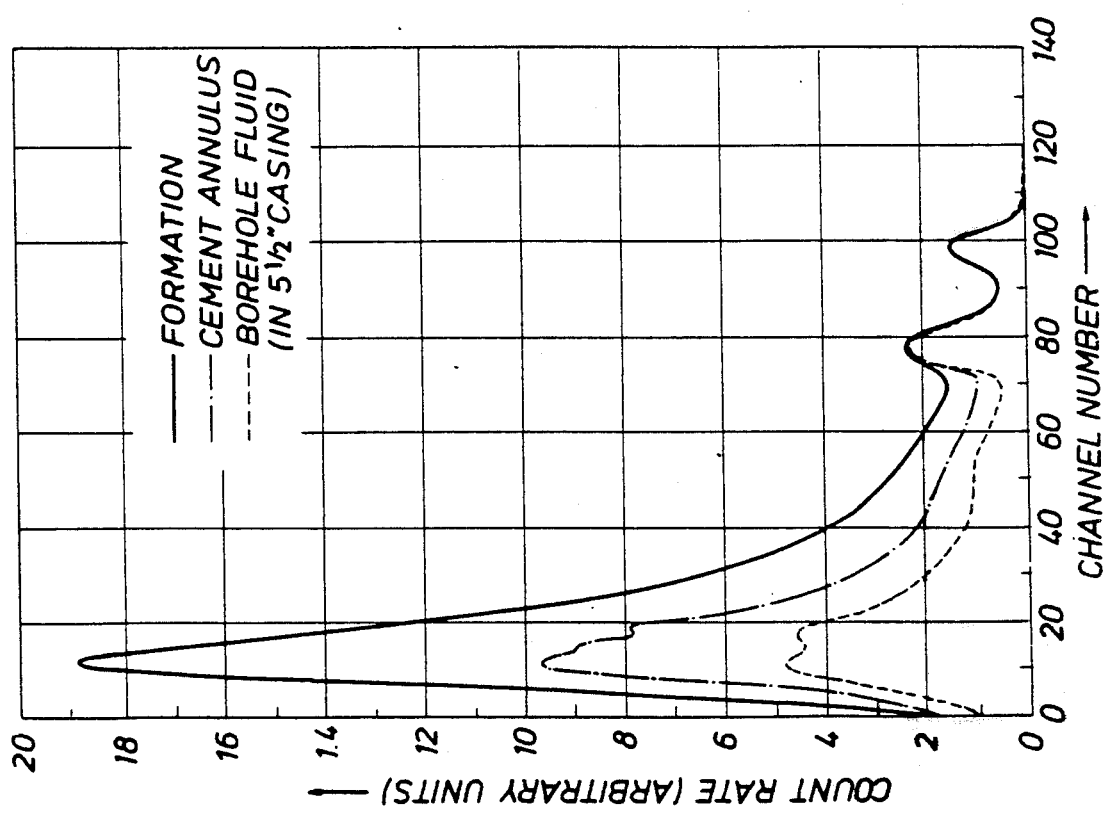
FIG. 3 shows the effects of Compton scattering on $^{46}$Sc tracer gamma ray spectra with the tracer located in the borehole, in the cement annulus and in the formation in a cased well borehole.

Referring now to FIG. 3, the effects of Compton scattering from different locations from scandium-46 is illustrated in the form of a gamma ray spectra having channel number extent of 0-140. These spectra were taken with apparatus of the type discussed with respect to FIG. 1.

The curves of FIGS. 2 and 3 clearly show that there is a spectral shape change with increasing distance from the source of gamma rays to the detector. In higher energy ranges (above 100 keV) these shape changes are due to increased Compton scattering which occurs when more and more material is interposed between the source and the detector. In the spectra of FIG. 3 for the scandium-46 tracer in the borehole fluid, in the cement, and in the formation, the spectra shown are normalized so that each 1121 keV (channel 99) peak has the same height. Observe that the formation spectrum is much more downscattered than that of the borehole fluid. Also, note that the downscattered character of the cement spectrum is intermediate between those of the formation and borehole fluid. This is consistent with the location of the cement between the borehole and the formation. Hence, there is a progressive increase in relative downscattering with increasing distance from the logging instrument.

Compton ratio measurements utilizing the downscattering difference principle have been used in the past to identify the distance from the detector of a flowing stream of activated oxygen and a vertical water flow tool. See, for example, Arnold and Paap, *Journal of Petroleum Technology*, January 1979, pages 121–130, "QUANTITATIVE MONITORING WATER FLOW BEHIND AND IN WELL BORE CASING". A more recent paper discuss the feasibility of using Compton downscattering ratios to determine the location of a tracer downhole with respect to a gamma ray spectroscopy logging tool. See for example, Anderson, Pearson, Abou-Sayed and Meyers, *SPE Paper, Number 15439, 61st Annual Technical Conference, New Orleans, La., Oct.* 5–8, 1986 "DETERMINATION OF FRACTURE HEIGHT BY SPECTRAL GAMMA LOG ANALYSIS".

For each of the six tracers previously mentioned, a Compton ratio has been developed which maximizes the statistical Compton scattering signal-to-noise value. The energy ranges for these optimal ratios are very similar and hence a single Compton ratio, $R_c$, can be used to identify Compton downscattering effects for all six of the tracers discussed herein. $R_c$ is defined to be a high energy count rate (in the range 350 keV to 3000 keV) divided by a low energy count rate (150 keV to 350 keV).

Referring now to Table I below, $R_c$ values for potassium and for each of the six tracer isotopes previously discussed are given for measurements made

TABLE I
COMPTON RATIO MEASUREMENTS FOR LOW-Z TOOLCASE TOOL.

| Tracer | Borehole | Rc Cement | Formation |
|---|---|---|---|
| $192_{Ir}$ | 0.37 | 0.23 | 0.16 |
| $131_{I}$ | 0.55 | 0.34 | 0.20 |
| $198_{Au}$ | 0.74 | 0.47 | 0.29 |
| $124_{Sb}$ | 1.11 | 0.86 | 0.70 |
| $46_{Sc}$ | 1.24 | 0.94 | 0.72 |
| Potassium | 1.23 | 1.06 | 0.89 |
| $110m_{Ag}$ | 1.42 | 1.03 | 0.69 | with a low-atomic toolcase number instrument according to the FIG. 1, with tracers located in the borehole, the cement annulus are in the formation. Note that similar trends are observed for each tracer element. That is, $R_c$ becomes larger as the tracer location approaches the tool. It is also clear that the absolute $R_c$ ratio magnitude is a strong function of the gamma ray energy emitted from this each tracer. $R_c$ usually increases as the average energy increases. Similar results for $R_c$ have also been obtained from gamma ray spectroscopy data gathered using a large diameter tool with a titanium tool case as well as a small diameter tool with steel toolcase.

The Compton ratio, $R_c$, can be useful in single element tracer jobs to identify the mean radial location of the tracer. It can also be used to partition the weighted-least square fit sensitivity matrix elements between the borehole and formation components as described earlier in equation (1). Another application for $R_c$ with a single tracer is in the investigation of cement and gravel pack placement operations. The application of $R_c$ in the analysis of multi-isotope tracer data is less clear since the $R_c$ for each tracer can vary widely. However, the general trends for individual isotopes can be distinguished so $R_c$ can be used at least qualitatively for these cases. Recent work has shown that it is possible to determine the average diameter of cement columns which have been tagged with radioactive tracers. See for example, Kline, Kocian and Smith, "Evaluation of Cementing Practices by Quantitative Tracer Radio Tracer Measurements" *I.A.B.C./SPE Paper Number* 14778, 1986, *Conference of International Association of Drilling Contractors-Dallas, Tex.* (Feb. 10–12, 1986). In this work a physical model is used in conjunction with calibration of measurements to extract the diameter of a tagged cement sheath. The model sets forth a relationship between the observed count rate from the tracer and the cement thickness. Two major difficulties which must be solved before converting this particular technique into field practice are that first, the tracer concentration per unit volume of cement must be known or measured and then this concentration must be uniformly maintained for all the cement slurry which is tagged. Secondly, the desired quantity (cement diameter) can be extracted only through the use of fairly complex numerical methods on a computer.

The previously mentioned Arnold and Paap reference showed that the first problem can be eliminated by using the data in the form of a Compton ratio which is, of course, independent of source strength. The second difficulty can be solved by exploratory data analysis which is verified, by approximating the expression obtained in the model of the Kline, Kocian and Smith paper, that the Compton ratio data can be linearized by parameterizing it with the inverse square of the cement diameter D according to Equation 2.

$$R_c = A + B/D^2 \qquad (2)$$

Figure 4:
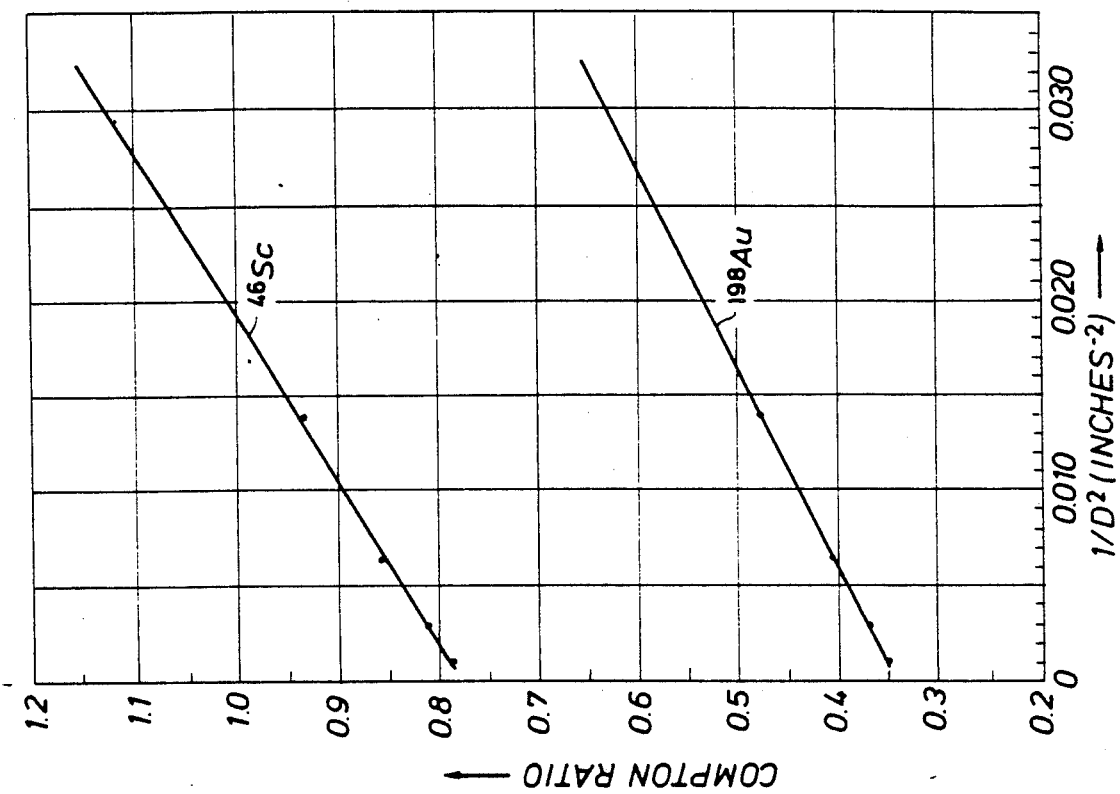
FIG. 4 shows graphically calibration results for Compton ratio $R_c$ versus cement diameter outside casing using $^{46}$Sc and $^{198}$Au tracers.

In the expression of Equation 2, A and B are constants which are dependent on the tracer type and casing diameter. FIG. 4 of the drawings shows the results of fitting Equation 2 to Compton ratio data for gold 198 and scandium 46. Solid lines are the best fits through the experimental points. Thus, it is possible to use this addition to the other techniques incorporated in the present invention to determine cement thickness and to help evaluate the quality of cementing operations. This technique is also directly applicable to the characterization of gravel packs in producing zones.

One of the features of the present invention is that measurements in the low energy photoelectric region can be made when using a well logging tool having a low atomic number toolcase. Photoelectric ratio measurements can make it possible to distinguish the distribution of tracers inside and outside the casing.

In cased hole situations photoelectric absorption is the most important mode of gamma ray attenuation for energies less than about 100 keV. This process is dominated by the element with the highest atomic number located between the source of the tracer gamma rays and the detector in the logging tool. For operations with the low atomic number toolcase, the iron in the well casing has by far highest atomic number of any significant downhole constituent. Thus, the low energy portion of a tracer spectrum made using the low atomic number toolcase will be strongly influenced by whether or not the tracer element gamma rays had to pass through the casing before reaching the detector.

Figure 5B:
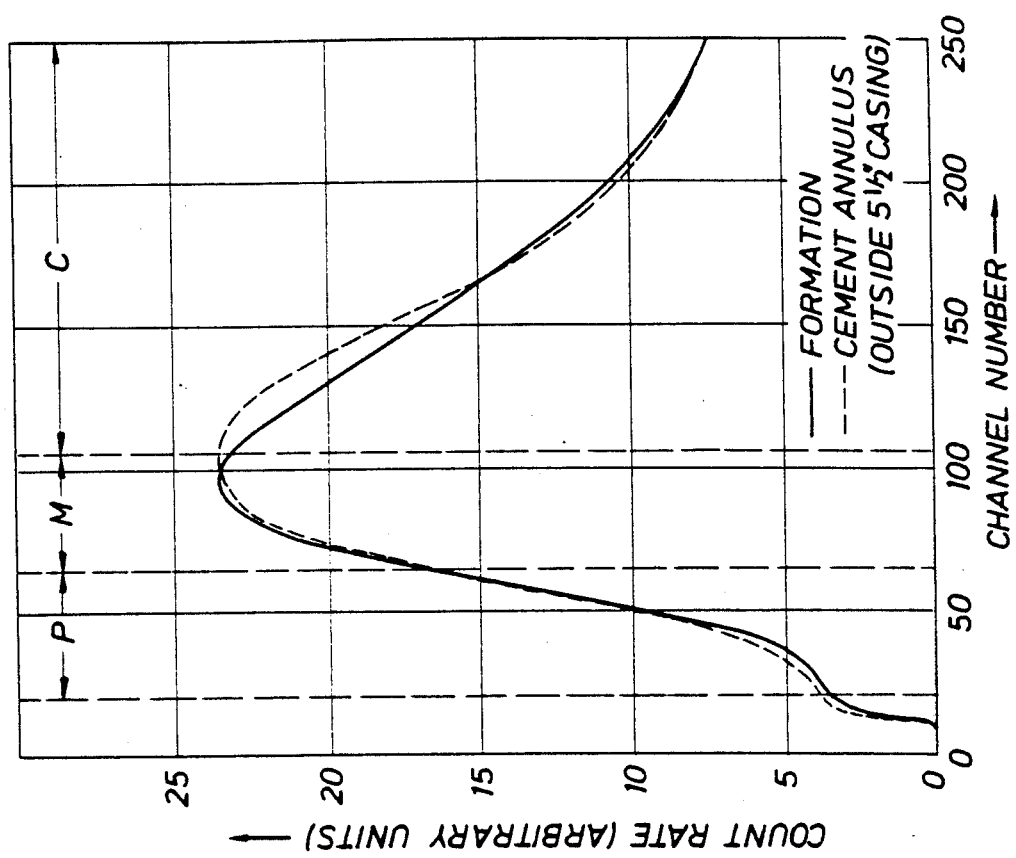
FIGS. 5a and 5b show the effects of photoelectric absorption for $^{198}$Au tracer in borehole and formation and cement annulus and formation.
Figure 5A:
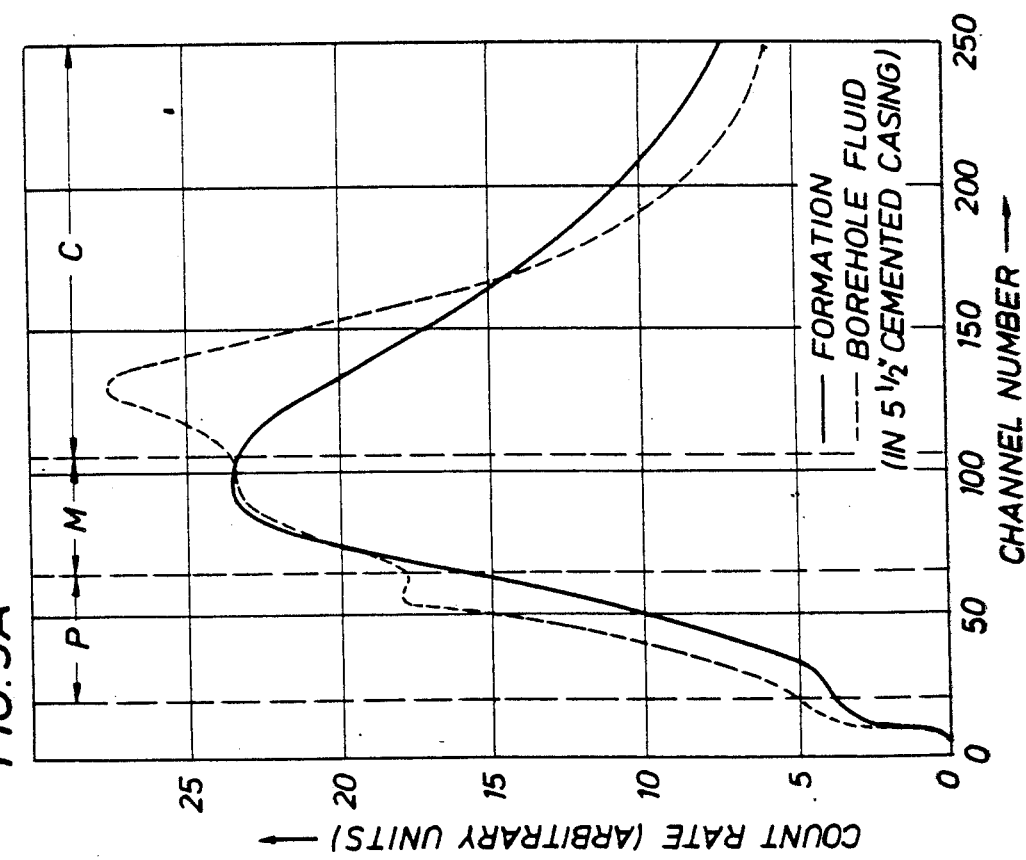

Low energy spectra in the range 0–350 KeV are shown in FIGS. 5a and 5b. The spectra overlayed in FIG. 5a show the difference in photoelectric absorption from gold 198 gamma rays originating in the formation outside a cemented 5½ casing relative to those coming from the inside of the casing. The spectra can be visually divided into three energy ranges as indicated. The lowest energy range P is sensitive to photoelectric absorption differences caused by the casing. The mid-energy range M is a region for which the photoelectric absorption and the Compton downscattering effects are nearly of the same importance. The upper energy range C is that for which Compton downscattering is significant and photoelectric absorption is negligible. A ratio $R_p$ of gamma ray count rates in window M compared to window P is clearly photoelectrically sensitive and yet not markedly affected by Compton scattering effects.

These spectra should be compared with those in FIG. 5b where the gold-198 spectra from the formation and the cement annulus (both outside the casing) are overlayed. Note that all spectral differences occur in Window C which is dominated by the Compton down-scattering whereas the spectral shapes in windows M and P are nearly identical. Hence the photoelectric ratio $R_p$ is defined as the ratio of counts in region M divided by counts in region P.

This ratio $R_p$ is not very sensitive to whether the gamma rays from a tracer outside the casing, are coming from the cement or the formation. Thus, $R_p$ has a characteristic relative to $R_c$ in that it is not affected by changes in the radial tracer distribution outside the casing, while at the same time $R_p$ is sensitive to the fraction of tracer inside the casing.

Table 2 shows photoelectric ratio measurements made with a low-atomic number toolcase similar to the system of FIG. 1 for the various tracers previously discussed and potassium. In Table 2 the tracer material is either in the borehole, in the cement or in the formation. Note that in each case $R_p$ is sensitive to changes from inside the casing to outside the casing, but, is not much effected by changes occurring outside the casing.

TABLE 2
PHOTOELECTRIC RATIO MEASUREMENTS FOR LOW-Z TOOLCASE TOOL.

| Tracer | Borehole | Rp Cement | Formation |
|---|---|---|---|
| $192_{Ir}$ | 1.56 | 2.39 | 2.46 |
| $131_I$ | 1.76 | 2.29 | 2.48 |
| $198_{Au}$ | 1.66 | 2.23 | 2.40 |
| $124_{Sb}$ | 1.84 | 2.17 | 2.16 |
| $46_{Sc}$ | 1.86 | 2.05 | 2.16 |
| Potassium | 1.41 | 2.10 | 2.19 |
| $110m_{Ag}$ | 1.94 | 2.22 | 2.17 |

Also, note that $R_p$, unlike $R_c$, is similar in magnitude for all the tracer isotopes. This is due in part to a selection of the energy ranges P and M. Therefore, $R_p$ can be interpreted for the presence of tracers in the borehole fluid in multiple tracer operations without accurate knowledge of either of the relative concentrations of all the tracers involved or of the radial distribution of any tracer outside the casing. It should be noted that $R_p$ is sensitive to changes in casing diameter. It must be recalled, however, that $R_p$ may only be obtained if the low Z toolcase is used in the gamma ray spectral tool. Both the titanium or steel toolcases can prevent gamma rays in the photoelectric energy region from reaching the detectors. $R_p$, like $R_c$, can be used to partition the sensitivity matrix for each tracer between borehole and formation components, as disclosed in equation 1.

In operation, in the preferred embodiment of the invention multiple tracers are used to determine fracture height or proppant height in a logging run. A plurality of standard spectra for each of the chosen tracers is utilized. There will be at least one standard gamma ray spectrum taken with each tracer isotope or isotopes inside the casing and at least one standard gamma ray spectrum taken with each tracer isotope or isotopes outside the casing. The unknown gamma ray spectrum is measured in the depth region of interest in the unknown borehole. The weighted least squares technique which is described in the aforementioned copending U.S. application may then be used to fit all of the gamma ray spectra of the tracers both inside and outside the cased hole or a subset of these to the unknown gamma ray spectrum. This yields a result of determining the amount of tracer both inside the borehole and outside the borehole simultaneously. Using this technique, only a single pass of the well logging instrument is required through the zone of interest in order to make the determination.

In the alternative embodiment, the photoelectric ratio $R_p$ or the Compton ratio $R_c$ as previously defined may be observed and utilized along with Equation 1 to determine the x-parameter in partitioning the sensitivity matrix between borehole and formation components for each tracer. These composite sensitivity matrix elements are then used to solve for the total concentrations of each tracer. The borehole and formation component will not be separated in this solution, however, but the answers will be more accurate for total tracer concentrations because more accurate overall "standard" spectra for each element will have been used in the least-squares fit.

It may also be desirable to obtain x via the expression defined in Equation 3.

$$x = \frac{u}{u + v} \quad (3)$$

That is, where u is the approximate computed concentration of tracer in a zone containing only borehole tracer and u+v is the approximate computed concentration of tracer in all other zones containing both borehole and formation tracers. These approximate concentrations are obtained using only prespecified tracers standard spectra, fitted to the observed data in an initial estimate to the concentrations. It may be possible to assist in determining the zone containing only borehole tracer by using the value of $R_p$ or $R_c$ in this zone (comparing to expected values for borehole located tracers).

Thus, in this alternative embodiment the parameter x can be determined by measuring the photoelectric ratio $R_p$ or Compton ratio $R_c$ as an approximate indicator of partitioning between the borehole and formation tracer concentrations; it might be desirable in some multitracer applications to determine x using the technique described in equation (3) above. It may also be possible to determine the partitioning parameter x using some other criterion which approximately partitions the observed spectral count rates between borehole and formation components.

Then the standard spectra S(d) of equation (1) for each tracer may be characterized as a linear combination of the B and F spectra as previously stated with respect to Equation (1) once the x parameter has been determined in any of the foregoing manners. The computed concentrations using S(d) will be total concentrations for each tracer (no borehole vs formation component will be obtained).

Summarizing, the techniques of the present invention disclose alternative methods for measuring the amount of tracer material in a well borehole and the surrounding formation. In one embodiment, this may be done simultaneously on one pass of a gamma ray spectral logging instrument wherein both borehole and formation standard matrix elements are input to a least-squares fitting technique, and the observed concentrations contain both borehole and formation components of these standard spectra.

In the alternative embodiment (which can require reduced computational power since fewer matrix elements are required) the sensitivity matrix elements for both borehole and formation components are not explicitly considered, but rather only one standard spectral shape for each tracer is input to the fitting program. The spectral shape S(d) for each tracer is determined by partitioning S(d) between a borehole component and a formation component. The partitioning parameter "x" is obtained from several possible sources of information, including: a photoelectric ratio $R_p$, a Compton ratio $R_c$, an initial estimate of borehole versus formation count rates based on a knowledge of zones in the well where only borehole counts are present, or possibly some other partitioning function based on borehole size or on an a priori knowledge of the approximate anticipated borehole versus formation count rates based on the specific procedures and events which occurred during the specific pumping operation.

The foregoing discussions may make other alternative arrangements and embodiments according to the present invention apparent to those skilled in the art. It is the aim of the appended claims to cover all such changes and modifications as fall within the true spirit and scope of the invention.

We claim:

1. A method for performing gamma ray well logging of plural radioactive tracer element isotopes in an unknown cased well borehole wherein standard gamma ray energy spectra of selected individual tracer elements taken at least substantially with the individual tracer elements disposed within a case standard borehole and disposed without a cased standard borehole are used in the analysis of gamma ray count data taken in the unknown borehole, comprising the steps of:

moving a well logging instrument sized and adapted for passage through a well borehole through the unkown well bore and detecting gamma radiation emitted from plural selected radioactive tracer isotopes at different depth levels in the well borehole;

separating said detected gamma radiation into a measured unknown gamma ray energy spectrum at each of a plurality of depth levels in the unknown borehole;

at such depth levels in the unknown borehole, separating said measured unknown gamma ray energy spectrum into components parts attributable to each such selected radioactive tracer isotope disposed within the unknown borehole and disposed without the unknown borehole by comparing said measured unknown gamma ray energy spectrum with said plurality of standard gamma ray energy spectra of said selected tracer elements disposed within and without the cased standard boreholes in which said standard gamma ray spectra are obtained and recording said component parts as a function of borehole depth.

2. The method of claim 1 wherein the step of comparing said measured unknown gamma ray energy spectrum and said standard gamma ray spectra are performed by fitting said measured unknown spectrum to said standard spectra using a weighted-least squares fitting technique of all selected tracer isotope standard spectra components to the measured unknown spectrum.

3. A method for performing gamma ray well logging of plural radioactive tracer isotopes in an unknown cased well borehole wherein standard gamma ray energy spectra of selected individual tracer elements taken at least substantially with the individual tracer elements disposed within a cased standard borehole and disposed without a cased standard borehole are used in the analysis of gamma ray count data taken in the unknown borehole, comprising the steps of:

moving a well logging instrument sized and adapted for passage through a well borehole through the unknown well borehole and detecting gamma radiation emitted from plural selected radioactive tracer isotopes at different depth levels in the well borehole;

separating said detected gamma radiation into a measured unknown gamma ray energy spectrum at each of a plurality of depth levels in the unknown borehole;

at such depth levels in the unknown borehole, separating said measured unknown gamma ray energy spectrum into parts attributable to each such radioactive tracer isotope by forming a single composite standard gamma ray energy spectrum of each selected tracer isotope at the depth level of the unknown measured gamma ray spectrum from a linear combination of said selected standard tracer isotope energy spectra from within and without the borehole, weighted for the portion of said spectra of said selected tracer isotopes expected to be located both within and without the well borehole at the depth level of the measured spectrum, and then comparing said single standard gamma ray spectra so formed for the selected tracer isotope with said measured unknown gamma ray energy spectrum at the depth level of the measurement, and recording said parts attributable to each tracer as a function of borehole depth.

4. The method of claim 3 wherein the portions of said standard gamma ray energy spectra of said selected tracer isotopes at each depth level are estimated by forming a photoelectric ratio $R_p$ of gamma ray counts in an energy region of the gamma ray spectrum which is sensitive to photoelectric absorption of gamma rays to gamma ray counts in an energy region of the gamma ray spectrum which is not sensitive to photoelectric absorption of gamma rays to a degree sufficient to markedly affect said ratio $R_p$.

5. The method of claim 3 wherein the portions of said standard gamma ray energy spectra of said selected tracer isotopes at each depth level are estimated by forming a Compton ratio $R_c$ of gamma ray counts in an energy region of the gamma ray spectrum which is sensitive to Compton scattering of gamma rays to gamma ray counts in an energy region of the gamma ray spectrum which is not sensitive to Compton scattering of gamma rays to a degree sufficient to markedly affect said ratio $R_c$.

6. The method of claim 3 wherein the steps of comparing said measured unknown gamma ray energy spectrum and said selected tracer isotope gamma ray energy spectra are performed by forming a single gamma ray energy spectrum of each selected tracer isotope at the depth level of the unknown measured gamma ray spectrum by use of a priori knowledge of borehole conditions and from a combination of said standard spectra taken in weighted mixture perceived according to said a priori knowledge of the distribution of said selected tracer isotope within and without the borehole at the depth level of the measurement.

* * * * *